US012370734B2

(12) United States Patent
Kragh

(10) Patent No.: US 12,370,734 B2
(45) Date of Patent: *Jul. 29, 2025

(54) DEVICE AND METHOD FOR PRODUCING ELECTRODES FOR ELECTROCHEMICAL REACTION

(71) Applicant: RELIEFED AB, Varberg (SE)

(72) Inventor: Mark J. Kragh, Varberg (SE)

(73) Assignee: Reliefed AB, Varberg (SE)

( * ) Notice: Subject to any disclaimer, the term of this patent is extended or adjusted under 35 U.S.C. 154(b) by 9 days.

This patent is subject to a terminal disclaimer.

(21) Appl. No.: 18/687,612

(22) PCT Filed: Aug. 31, 2022

(86) PCT No.: PCT/EP2022/074230
§ 371 (c)(1),
(2) Date: Feb. 28, 2024

(87) PCT Pub. No.: WO2023/031287
PCT Pub. Date: Mar. 9, 2023

(65) Prior Publication Data
US 2024/0355998 A1    Oct. 24, 2024

(30) Foreign Application Priority Data

Aug. 31, 2021  (SE) .................................. 2151090-4

(51) Int. Cl.
*B29C 48/35* (2019.01)
*B29C 43/46* (2006.01)
(Continued)

(52) U.S. Cl.
CPC .............. *B29C 48/35* (2019.02); *B29C 43/46* (2013.01); *B29C 48/0011* (2019.02);
(Continued)

(58) Field of Classification Search
CPC .......... B29C 48/35; B29C 48/21; B29C 48/49
See application file for complete search history.

(56) References Cited

U.S. PATENT DOCUMENTS 2,680,547 A   6/1954  Donath
3,253,073 A   5/1966  Skobel
(Continued)

FOREIGN PATENT DOCUMENTS

EP    0406467 A1    1/1991
EP    0484868 A1 *  5/1992  ............. B29C 48/22
(Continued)

OTHER PUBLICATIONS

International Search Report mailed Dec. 21, 2022; International Patent Application No. PCT/EP2022/074230 filed Aug. 31, 2022. ISA/EP.

(Continued)

*Primary Examiner* — Atul P. Khare
(74) *Attorney, Agent, or Firm* — McDonald Hopkins LLC

(57) ABSTRACT

The disclosed invention refers to a device and a method for 3D-extruding electrodes that are useful for electrochemical reactions or energy storage in batteries, secondary batteries, capacitors or fuel cells. The described method solves problems of time and cost-consuming steps, by integrating many steps into one step, by co-extruding with rotating dies onto a base profile, enabling elimination of at least one production step at the same time as it enables extrusion of electrodes with macro-, micro-, and/or nano-patterns, thus enabling bigger electrochemical reaction surfaces and cross-channels that speed-up filling of electrolyte.

20 Claims, 10 Drawing Sheets

(51) Int. Cl.
*B29C 48/00* (2019.01)
*B29C 48/21* (2019.01)
*B29C 48/34* (2019.01)
*B29C 48/49* (2019.01)
*H01M 4/04* (2006.01)

(52) U.S. Cl.
CPC ............ *B29C 48/002* (2019.02); *B29C 48/21* (2019.02); *B29C 48/34* (2019.02); *B29C 48/49* (2019.02); *H01M 4/0433* (2013.01); *Y02E 60/50* (2013.01)

(56) References Cited

U.S. PATENT DOCUMENTS

| | | | |
|---|---|---|---|
| 3,439,383 A | | 4/1969 | Martin |
| 3,869,304 A | * | 3/1975 | Bogulslawski ....... B29C 48/305 |
| | | | 118/410 |
| 4,683,095 A | | 7/1987 | Tolonen et al. |
| 5,453,238 A | * | 9/1995 | Bardy .................... B29C 48/21 |
| | | | 425/327 |
| 5,928,679 A | * | 7/1999 | Ohki ...................... B29C 48/49 |
| | | | 425/374 |
| 8,393,291 B2 | * | 3/2013 | Emoto ................ H01M 4/1391 |
| | | | 118/232 |
| 10,875,069 B2 | * | 12/2020 | Jansson Kragh ....... B29C 48/07 |
| 2002/0089098 A1 | | 7/2002 | Nagaya |
| 2004/0159964 A1 | | 8/2004 | Lavoie |
| 2006/0099289 A1 | * | 5/2006 | Fukumura ............. B29C 48/301 |
| | | | 264/177.1 |
| 2010/0247792 A1 | | 9/2010 | Emoto et al. |
| 2016/0141597 A1 | | 5/2016 | Umeyama et al. |
| 2019/0165368 A1 | | 5/2019 | Otohata et al. |

FOREIGN PATENT DOCUMENTS

| | | |
|---|---|---|
| EP | 3520988 A1 | 8/2019 |
| KR | 101888633 B1 | 8/2018 |
| SE | 2051217 A1 | 10/2021 |
| SE | 2051218 A1 | 11/2021 |
| SE | 2051216 A1 | 12/2021 |

OTHER PUBLICATIONS

Search Report mailed Mar. 30, 2022; Swedish Patent Application No. 2151090-4 filed Aug. 31, 2021.

\* cited by examiner

Sate of the art                Fig. 1

DEVICE AND METHOD FOR PRODUCING ELECTRODES FOR ELECTROCHEMICAL REACTION

CROSS-REFERENCE TO RELATED APPLICATION

This application is a 35 U.S.C. § 371 national stage application of PCT Application No. PCT/EP2022/074230 filed on Aug. 31, 2022 entitled "DEVICE AND METHOD FOR PRODUCING ELECTRODES FOR ELECTROCHEMICAL REACTION," which claims priority to Sweden Patent Application No. 2151090-4 filed on Aug. 31, 2021, each of which are incorporated herein in their entirety by reference.

TECHNICAL FIELD

The present invention relates to a device for making an electrode product and to a related manufacturing method.

BACKGROUND

Electrodes are used in different energy related devices and applications, such as energy storage or energy conversion. Some examples in this field are batteries, capacitors or fuel cells.

There is a general struggle to achieve a maximum energy storage and/or energy transition efficiency per an amount of material or volume used, respectively. Particularly in the field of electrical vehicles, a high density of energy with respect to the volume and weight of energy devices engaged are of high relevance. Further, a low inner electrical resistance should be achieved in order to allow for fast charging operations.

There is also an continuous struggle to reduce costs of the respective devices and related manufacturing methods. Here, one way known in the art is to create thinner electrodes. Another approach is to increase the surface of an electrode, wherein such electrodes are often referred to as 3D-electrodes and 3D-energy devices, respectively. Those are for example known as 3D-batteries or 3D-Fuel cells. This design principle is based on enhancing an electrical performance by providing enlarged electrochemical surface areas, may be porous or structured for example.

Many of such known electrodes are based on an extruded material that is exposed to secondary processes. Such processes may be mechanical, for example in case of calendaring or chemical, for example in case of etching or even of a different type, such as laser or plasma printing.

Based on this, there is a demand of additional energy and space supply in a relate manufacturing system. if chemicals are engaged, there further is a hazardous impact in the environment and human workforce, in particular.

With this said, secondary processes are generally adding high costs to the manufacturing method and the manufactured product, respectively.

An exemplarily technical solution known from the prior art is described with reference to FIG. 1 further down.

In view of the above-mentioned examples of the prior art, there is a need for an improved possibility of manufacturing an electrode product.

SUMMARY

Accordingly, the objective underlying the invention disclosed herein is to eliminate deficiencies of the prior art. In particular, the invention disclosed herein aims at providing a device and a corresponding method of manufacturing an electrode product in a more efficient manner.

This objective is achieved by the technical subject-matter of the independent claims. Preferred embodiments of the invention can be gained from the dependent claims and the present disclosure as a whole.

A first aspect of the invention refers to an extrusion device for forming an electrode product made from an electrode material in a production direction, said device comprising: a first rotating die, extending in a radial direction and a width direction, having two opposite first and second side walls and an outer circumferential surface extending in the width direction there between, wherein the first rotating die comprises a first side portion in connection to the first side wall and a second side portion in connection to the second side wall and a mid-portion extending between the first and second side portions, and the device further comprises an electrode profile definition zone having a longitudinal direction coinciding with the production direction, a height direction and a width direction being perpendicular to the height direction, said electrode profile definition zone comprising a through channel comprising a first channel section followed by a second channel section downstream the first channel section with reference to the production direction, and wherein the first rotating die is rotatable about an axis extending across the production direction and arranged to allow the outer circumferential surface to, while the first rotating die rotates, exert a pressure onto a surface of the electrode material when fed through the profile definition zone, and the first channel section is circumferentially delimited by one or more walls and the second channel section is circumferentially delimited by the circumferential surface of the first rotating die and a channel portion, which comprises at least a counter-bearing opposite the first rotating die. Preferably, the second channel is further circumferentially delimited by opposing first and second channel portion side walls between the first rotating die and the counter-bearing, or by that the first and second side portions of the rotating die comprises first and second flange portions extending in a radial direction with an extension exceeding the radial extension of at least a part of the mid-portion of the rotating die, wherein the first and second flange portions are arranged to prevent movement of the material outside the rotating die.

According to the invention, the through channel is configured to receive an electrode substrate material to be fed downstream and the device further comprises at least one additional inlet channel, which is configured to receive an electrode surface material and to feed it to the through channel, wherein said at least one additional inlet channel and the first channel section of said through channel are combined in a marriage section in a manner that said electrode surface material is extruded onto said electrode substrate material, which effects that inside the second channel section at least a first surface of said electrode material, that is oriented towards the first rotating die, comprises said electrode surface material, wherein said marriage section is either located upstream of where the first channel section transitions into the second channel section or at this location, and wherein further the second channel section is configured to deform the electrode material into the electrode product having a minimum height by the first rotating die being configured to apply increasing pressure on the electrode material against the counter-bearing when the electrode material exits the first channel section, and wherein the first rotating die is configured at a minimum distance between the first rotating die and the counter-bearing dependent on a maximum allowable pressure applied by the first rotating die at the position of that minimum distance, wherein the maximum allowable pressure corresponds at least to the maximum difference in height of the electrode material exiting the first channel section and the height of the electrode product.

This means, the device according to the invention is capable of master forming the electrode product from a plurality of input materials, shaping a surface of said electrode product and finishing said electrode product in a calendaring-type of process step in an integral manner that can be reduced down to a single manufacturing step.

Instead of first manufacturing an electrode product in a number process steps as known from the prior art, subsequently adding structure to the surface of the electrode product and finally exposing the electrode product to a calendaring process, the device of the invention is configured by means of the at least one rotating die to shape the surface structure and dimensions of the electrode product, while said electrode surface material is extruded onto said electrode substrate material.

Based on the above said, the device of the invention allows for a very efficient manufacturing of the electrode product in an integral process. At the same time, all requirements, such as 3D-shaping the electrode surface and manufacturing the electrode product in a continuous manufacturing process, can be fulfilled.

In particular, the rotating die may be adapted to provide a macro-, micro- and/or nano-structure on the surface of the electrode product.

The term "extrusion device" can also be referred to as a co-extrusion device and/or on-extrusion device. It can also be referred to as a pultrusion device, depending on the particular design of the manufacturing process, wherein the device of the invention is used. These terms are well understood by a person skilled in the art and therefore, such a person will face no difficulties in coming up with various adapted embodiments of the device of the invention and the manufacturing process run by it, based on the present disclosure.

Advantageously, the electrode product may comprise several layers of one or more identic or different electrode substrate and surface materials. For example, the electrode substrate material may be master formed or comprise a string of solid material, being stiff or bendable, or a foil. Said solid material may also be embedded into a master formed electrode substrate material. The term "solid material" refers to a material that is not deformed in the electrode profile definition zone in a respective manufacturing method. A non-exhaustive list of examples of solid materials are: a bendable wire, a stiff rod-like element, a mesh of metal, fabric, composite, other suitable materials or any combination of such solid materials.

Advantageously, the maximum allowable pressure can be controlled at least in the second channel sections, which provides a possibility to design the device of the invention dependent on the electrode material to be processed and to a desired process speed. Controlling the maximum allowable pressure dependent on the electrode material to be processed, further allows for a high production rate and a high quality output and also reduces the risk of damage to the electrode material, e.g. the risk of rupture due to an inadmissible stress level imposed on the electrode material. Also a risk of damaging the device of the invention is reduced.

Based on the desired manufacturing method to be executed by the device of the invention, the electrode material, which comprises at least said electrode substrate material and electrode surface material, may comprise a plastically deformable material and/or viscoplastic material and/or viscoelastic material. At least the electrode surface material comprises properties making the electrode product suitable to function as an electrode. Such materials are well known in the art and some examples are provided further down.

For meanings of clarity it shall be noticed that the term "upstream" refers to any point that is located at a distance to a reference point in a direction that opposes the manufacturing direction. Accordingly, it can be referred to "downstream", if the focus is put on any point that is located at a distance to said reference point in a direction that flows with the manufacturing direction. Said reference point can be chosen freely within the material flow path.

Plastically deformable materials, for example metals, are deformed permanently, when subjected to a sufficiently high force. Permanent deformation is generally referred to as plastic deformation and therefore materials, which exhibit this type of deformation, are referred to as plastically deformable materials in the art. The deformation behaviour of a plastically deformable material depends on the magnitude of the force that the material is subject to and is often described in so called "stress-strain curves". Generally, plastically deformable materials exhibit the following deformation behaviour: When the material is subjected to a small force it deforms elastically because the stress in the material increases the distance between the atoms in the material but does not affect their mutual arrangement. Therefore, the material reverts linearly to its original dimension when the force is removed. Thus, in this force region the material exhibits a linearly elastic deformation behaviour. If a larger force is applied to the material, the stress in the material increases. When the stress passes the so-called elastic limit, the atom planes in the material begin to slide over one another. This effect is not reversed, if the force is removed and a permanent deformation of the material is therefore achieved. Thus, in this force region the material exhibits a plastic deformation behaviour. If the force is increased further, the stress will exceed the rupture limit of the material and the material will eventually break.

Viscoplastic materials can be described by help of the theory of viscoplasticity. It describes materials that behave as solids below a critical value of stress but flows like a viscous liquid at greater values of stress. For metals and alloys, viscoplasticity is the macroscopic behaviour caused by a mechanism linked to the movement of dislocations in grains, with superposed effects of intercrystalline gliding. The mechanism usually becomes dominant at temperatures greater than approximately one third of the absolute melting temperature. Thus, these materials become viscoplastic materials above this critical temperature. A main difference between viscoplastic materials and non-viscoplastic materials is that the viscoplastic material exhibits a rate-dependent deformation behaviour in the force region of plastic deformation. That is, the viscoplastic material does not only deform permanently after the application of the force but continues to undergo a creep flow as a function of time under the influence of the applied force. This creep flow further deforms the viscoplastic material.

A further type of materials is known as viscoelastic materials. Viscous materials, like glycerine, oil or water, resist shear flow and strain linearly with time when a stress is applied. In purely viscous fluids, deformation is non-recoverable due to rearrangement of molecules. Elastic materials strain when stretched and immediately return to their original state once the stress is removed. A material is called viscoelastic if the material has an elastic (recoverable) part, as well as, a viscous (non-recoverable) part. When a load is applied onto a viscoelastic material, the elastic deformation is instantaneous while deformation of the viscous part occurs over time. Since viscoelastic materials have elements of both, elastic (recoverable) character and viscous (non-recoverable) character, it is considered to exhibit a time-dependent strain, i.e. it deforms over time by a so called creep. Viscoelastic materials may also be strain rate dependent, i.e. they may deform differently depending on how fast the load is applied. Examples of viscoelastic materials are polymers, of which the viscoelastic behaviour may be explained by entanglement and disentanglement processes on a molecular level of polymer chains.

In a preferred embodiment of the extrusion device of the invention, the first channel section is configured to deform the electrode material into a master profile having a maximum height at a predetermined feeding rate dependent on the electrode material and a minimum cross-sectional area with a first maximum height in the first channel section, and wherein the second channel section is configured to further deform the master profile into the electrode product having the minimum height by the first rotating die being configured to apply the increasing pressure on the master profile against the counter-bearing when the master profile exits the first channel section, and wherein the first rotating die is configured at the minimum distance between the first rotating die and the counter-bearing dependent on the maximum allowable pressure applied by the first rotating die at the position of that minimum distance, wherein the maximum allowable pressure corresponds at least to the maximum difference in height of the master profile and the electrode product.

Advantageously, the maximum allowable pressure can thus be controlled in both the first and second channel sections, which further enhances the above described possibly to design the device of the invention dependent on the electrode material to be processed, the desired process speed, as well as quality and safety requirements. By deforming the electrode material in two subsequent steps, which refer to the master profile being formed first and the electrode product being formed after that, the quality of the electrode product can be increased, for example with regard to dimensional tolerances.

In a further preferred embodiment of the extrusion device of the invention the counter-bearing comprises a second rotating die. Preferably, said counter-bearing is formed by the second rotating die. The second rotating die can comprise recesses and/or flange portions that can be arranged to cooperate with recesses and/or flange portions of the first rotating die.

The second rotating die significantly enhances the possibilities of controlling the above described process parameters. Further, movement of the electrode material in the manufacturing direction is improved. The first and second rotating dies may be designed and configured equally or differently.

In the following, if it is referred to the counter-bearing, this implies the possibility of combining or replacing said counter-bearing with/by the second rotating die, as stated above.

In a further preferred embodiment of the extrusion device of the invention, E the device comprises a third inlet channel that is connected to the first channel section and configured to feed an electrode surface material in the same manner as the other additional inlet channel, with said electrode surface material from the third inlet channel being extruded onto the electrode substrate material also on a second surface of the electrode material that comprises said electrode surface material, and which is exposed to the second rotating die, respectively.

This significantly increases the functional electrode surface of the electrode product.

In a further preferred embodiment of the extrusion device of the invention, a pattern is provided on the circumferential surface of at least one rotating die and further the maximum allowable pressure corresponds to the maximum difference in height of the electrode material exiting the first channel section or the maximum difference in height of the master profile, respectively, and to the electrode product and said pattern.

There are many different structures that may define the pattern, which may comprise a single structure or a plurality of structures. Since the pattern is provided on the circumferential surface of the rotating die, even complex structures can be applied to the electrode material in a single step. Preferably, such a pattern is designed so as to comply with the requirements defined the surface of the electrode product, which are well known in the art.

In a further preferred embodiment of the extrusion device of the invention, a pattern, preferably as described above, is provided on the circumferential surface of the first and second rotating dies. Those patterns may be designed equally or differently.

In a further preferred embodiment of the extrusion device of the invention, said pattern comprises a microstructure to enhance the surface area of the electrode product, thus forming a 3D-electrode. By using micro- or even nanostructures, experiments performed by the applicant have revealed a possibility of creating a 2 $cm^2$ electrochemical reaction surface area per only 1 $cm^2$ of electrode product surface area.

In a further preferred embodiment of the extrusion device of the invention, said pattern comprises protrusions forming at least one channel in at least one surface of the electrode product.

This allows for a significantly improved electrolyte filling, when the electrode product is exposed to such an electrolyte.

Preferably the channel is formed across the surface of the electrode product, even more preferred it is formed fully across said surface.

This further improves the electrolyte filling and allows for an increased production speed of batteries, said electrode product can be used for.

Generally, the pattern in the rotating die or dies causes a corresponding opposite pattern in the electrode product. For example, if the structure or structures forming the pattern on the rotating die are comprising an indentation, it causes a complementary opposite pattern comprising an elevation on the electrode product. If said structure comprises a protrusion, the electrode product will comprise an indentation, respectively.

In the area of such protrusions on the surface structure of the rotating die, the rotating die is thus configured at a minimum distance between the rotating die and the counter-bearing or second rotating die, respectively. In the area of such indentations on the surface structure of the rotating die, the rotating die is thus configured at a maximum distance between the rotating die and the counter-bearing or second rotating die, respectively.

Said configuration is done dependent on a maximum and maximum allowable pressure applied by the rotating die at the positions of said minimum and maximum distances, wherein the allowable pressure corresponds to the difference in height of the electrode material exiting the first channel section or that of the master profile, depending on the present embodiment of the device of the invention, and to the electrode product and further on said pattern in the circumferential surface of the rotating die or dies with regard to achieving the desired type of deformation in the area of the said structure. The allowable pressure further depends on the electrode material to be extruded or pultruded.

It should be noted that the pattern in the rotating die could be arranged such that the device of the invention simultaneously exhibits the minimum distance and the maximum distance, if the pattern is arranged such that the structure comprised by the pattern is positioned on the circumferential surface with surrounding portion(s) of the circumferential surface, at least in the width direction, comprising no structures when facing the counter-bearing.

As an alternative, the pattern may comprise a number of structures spread in the width direction with such non-structured portions between them facing the counter-bearing at the same time. Here, the rotating die exerts both maximum pressure, for example in the non-structured portion due to the minimum distance, and minimum pressure, for example in the structured portion due to the minimum distance, at least during a short time interval during rotation of the rotating die. The design choice of maximum pressure and minimum pressure further allows for an optimized form change of the electrode material to the electrode product dependent on material such that the material at the structures fills for example the indentations and becomes plastically deformed at the same time as the material between the outermost parts, in the radial direction of the rotating die, does not exceed the maximum pressure allowed for the material or the design of the device of the invention.

It should further be noted that some materials exhibit properties that allow for easy filling of the structures due to an initial pressure difference between the inside and the outside of the structure, for example the indentations. When the indentation is filled a steady state condition is achieved, with regard to pressure difference, during a short time period. In such a steady state condition the pressure in the material is balanced and the pressure difference is minimized. For some materials the pressure could be equal or essentially equal in both the indentations and the surrounding non-indentation areas during that part of the operation, when the indentation faces the counter-bearing and the indentation is filled.

With reference to, but not being bound to, the above definitions, it is believed that a minimum pressure is required to achieve plastic deformation. For example, it is believed that aluminium has a minimum pressure level that depends on inter alia a temperature. The higher the temperature, the less pressure is required. However, a too high pressure and thus a too high temperature may result in the aluminium liquefying, which removes the advantage of plastic deformation. The temperature increase in the material preferably is at least in part achieved in the first channel section where a minimum cross-sectional area forces a form change of the material with pressure on the material in all directions in the first channel section and the form change increases the temperature. In the second channel section, the rotating die or dies continue to change the shape, for example of the master profile into the electrode product by exerting a balanced pressure within the minimum and maximum limits. Should the rotating die comprise a pattern with one or more indentations, the minimum pressure is also vital for filling the indentations in a manner with sufficient pressure to achieve plastic deformation within the indentation. At the same time, that part of the rotating die lacking indentations exerts a higher pressure on the master profile due to a lesser distance between the rotating die and the counter-bearing than between the bottom of the indentation and the counter-bearing.

Hence, when the rotating die comprises the pattern, both the minimum pressure and the maximum pressure becomes especially important and thus the respective maximum and minimum distance between the rotating die and the counter-bearing or second rotating die, respectively.

In order to more easily explain the device, a cylindrical coordinate system may be used for the rotating die and an orthogonal Cartesian coordinate system for a three dimensional space for the device of the invention in general. The rotating die therefore is described as having a width direction from end to end coinciding with a centre line, i.e. rotation axis, about which the rotating die rotates, and a thickness in a radial direction being orthogonal to the width direction. The outer circumferential surface further extends about the axis in a rotation direction being perpendicular to the width direction. Here, rotation symmetric refers to a symmetrical disposition about the rotating axis or a rotational balanced disposition of the matter in the rotating die. The device in general, for example the electrode profile definition zone and the first and second channel sections, are described as having a width direction, a height direction and a longitudinal direction, where the longitudinal direction coincides with the general production direction. The rotating die is arranged to be rotatable about the axis and the axis can be directly or indirectly stored in and rotatably coupled to the first and second channel portion side walls.

With reference to the above-described coordinate systems it should be noted that the axis of the rotating die can be arranged perpendicular to the longitudinal direction, i.e. to the production direction of the device in general, or can be arranged at an angle.

According to one example, the axis of the rotating die is directed substantially perpendicular to the production direction with the outer circumferential surface extending across the production direction in a width direction thereof. According to one example, the axis of the rotating die coincides with the width direction of the device in general and the width direction of the rotating die coincide with the width direction of the device in general. The longitudinal direction coincides with the production direction, i.e. the main direction along which the material travels during production. According to one example, the axis of the rotating die does not coincide with the width direction of the device in general, but the axis of the rotating die and the width direction of the rotating die is arranged at an angle being less or more than 90 degrees to the longitudinal direction. However, the axis of the rotating die is arranged such that the outer circumferential surface extends across the production direction in a width direction thereof.

With reference to either one of the examples above, the normal to the axis of the rotating die coincides with the height direction of the device in general. Here, the normal coincides with the radial direction of the rotating die. Here, the axis of the rotating die is directed perpendicular to the normal of the production direction regardless of whether the axis of the rotating die coincide or not with the width direction of the device in general. However, according to one example the normal to the axis of the rotating die can be arranged at an angle to the height direction of the device in general. However, the axis of the rotating die is arranged such that the outer circumferential surface extends across the production direction in a width direction thereof, but at an angle to the production direction.

According to one example, the one or more walls define a first cross-section at the end of the first channel section and wherein the second channel section defines a second cross-section at a position where the distance between the circumferential surface and the counter-bearing is at a minimum. As stated above, the geometry of the first channel section is different from the second channel section such that the material passing through the first channel section changes form when entering the second channel section. The changing of form is essential for increasing or maintaining the pressure level to such an extent that it will overcome the internal resistance (shear stresses) of the material, fast enough, for the material to saturate the second cross section, including an imprint of the rotating die.

According to one example, the minimum distance in the height direction between the circumferential surface and the counter-bearing in the second cross-section is less than a maximum distance in the height direction in the first cross-section. This has the advantage that the material entering the second channel section will be compressed in the second channel section such that the pressure is increased or maintained to such level that the material will transform fast enough to saturate the second channel section, including the imprint of the rotating die.

Hence, the pressure is increased or maintained to such level that the material will transform fast enough to saturate the second channel section, including an imprint of the rotating die. The pressure is achieved by a combination of an imprint depth of a pattern in the circumferential surface and a Poisson effect and/or a combination of the shape transition due to the geometrical shape difference between the first and second cross-sections and the Poisson effect.

According to one example, the geometry of the first channel section is different from the second channel section such that the material passing through the first channel section changes form when entering the second channel section, wherein for example the master profile has a first cross-section area geometry corresponding to the first cross-section and wherein the electrode product has a second cross-section area geometry defined by the second cross-section, wherein the first cross-section area geometry is different from the second cross-section area geometry in any given comparable position, wherein the maximum pressure and thus the minimum distance in the second channel section is dependent on a difference of cross-section area geometry of the master profile and the cross-section area geometry of the final profile.

This has the advantage that the second channel section can be optimized dependent on the level of material transformation from the master profile to the final profile.

According to one example, the rotating die is configured, before forming the electrode product, to alter form during forming of the electrode product dependent on the maximum allowable pressure and/or, wherein the counter-bearing is configured, before forming the electrode product, to alter form during forming of the electrode product dependent on the maximum allowable pressure.

This has the further advantage that the rotating die can be configured to change shape from a start-up procedure to steady state operation conditions due to heat and pressure during the production, giving a predicted shape of the electrode product. This has the further advantage that the counter-bearing can be configured to change shape due to heat and pressure during the production, giving a predicted shape of the electrode product in a similar manner.

According to one example, the first channel section comprises side walls in the form of a top pre-bearing and an opposing bottom pre-bearing. The top pre-bearing is arranged over the opposing bottom pre-bearing in the height direction and are advantageously positioned in or at least in the vicinity of where the first channel section transitions into the second channel section. One advantage here is that the top pre-bearing and/or the bottom pre-bearing can be optimised to release a certain electrode material cross-section geometry into the second channel section.

According to one example, also the top pre-bearing and/or the bottom pre-bearing can be configured in a similar manner as the rotating die and/or the counter-bearing to change form from a start-up procedure to a steady state operation.

According to one example, the maximum pressure and thus the minimum distance in the second channel section is dependent on the total feeding rate of material in the first channel section, type of material, and temperature of the material when entering the second channel section. This has the advantage that the second channel section can be optimized dependent on manufacturing speed and material.

According to one example, the maximum allowable pressure applied by the rotating die at the position of the minimum distance is dependent on friction between the material and the counter bearing in the second channel section.

This has the advantage that the pattern in the electrode product can be optimized dependent on shear stress applied from the counter-bearing in the second channel section due to friction.

According to one example, the cross-section area of the second channel section is configured to be sized with regard to a shrinking effect of the electrode material cooling down to the electrode product having a final height.

According to one example, the pattern in the rotating die is configured to be sized with regard to a shrinking effect of the electrode material cooling down to the electrode product.

According to one example, the pattern of the rotating die has at least one indentation, wherein each indentation comprises a release angle dependent on the radius of the rotating die, the intended pattern in the electrode product, the configuration of the counter-bearing and travelling speed of the electrode material in order to achieve the intended electrode product. The release angle in the indentation is arranged with relation to a release angle in a corresponding elevation created in the electrode product due to the electrode material being pressed into the cavity. Since the rotating die rotates, the indentation can be arranged with a shape that is different from the shape in the electrode product taking into account the rotation and release angles affect the shape of the elevation in the electrode product when the elevation is released from the indentation in the production direction.

This has the advantage that the pattern in the electrode product can be optimized dependent on design of the pattern in the rotating die.

According to one example, the device is configured to feed a friction material between the counter-bearing and the electrode material and/or configured to feed a friction material between the rotating die and the electrode material. One advantage here is that, the friction material can be used to define and therefore predict friction between the material in any of the first and/or second channels sections. The friction material can be a solid, liquid or gas and can be introduced into the device in any suitable way. For example, the friction material can be introduced by feeding the material to the rotating die and/or the counter-bearing via a separate channel arranged in connection to the first channel section and/or the second channel section. The friction material can alternatively be introduced to the rotating die before the rotating die rotates into the second channel section, i.e. the friction material travels along with the rotating die to the material in the second channels section. The friction material can alternatively be introduced to the electrode material before entering the first channel section. Should the friction material be a solid, it could be introduced as a sheet material or any suitable form that allows for the friction sheet to define friction between the material in any of the first and/or second channels sections. Should the friction material be a liquid, it can be introduced by dripping or injecting the liquid according to any one or a combination of the examples above, but is not limited to the examples. Should the friction material be a gas, it can be introduced by injecting the gas according to any one or a combination of the examples above, but is not limited to the examples.

According to one example, the width of the first channel section is, at least along a portion of its length and at least along a portion of its height, less than a distance between the two opposite side walls of the rotating die. Hence, the first channel section should be at least smaller in width than a distance between the opposing first and second channel portion side walls in the second channel section. The difference in width between the first channel section and the second channel section depends on features of the first and second side portions and tolerances between the rotating die and the respective opposing first and second channel portion side walls. The width of the first channel section should be less than a distance being the distance between the opposing first and second channel portion side walls minus the sum of tolerances, i.e. the sum of the gap between the rotating die side walls and the respective opposing first and second channel portion side walls in the second channel section. If the first and second side portion comprises flange portions, see below for further explanation, then the width of the first channel section is, at least along a portion of its length and at least along a portion of its height, less than a distance between the two flange portions. One advantage here is that local pressure reduction is achieved in connection to the first and second outer edge portions due to the geometrical difference in the first and second channel sections.

According to one example, local pressure reduction is achieved in connection to the first and/or second side portions due to the geometrical difference in the first and second channel sections and a wake effect downstream the first channel section in connection to the first and/or second side portions.

According to one example, the first channel section comprises a third side portion extending in the width direction, wherein the third side portion is arranged in relation to the first side portion such that a pressure in the material is less in connection to the first side portion than in connection to the third side portion, and/or wherein the first channel section comprises a fourth side portion extending in the width direction, wherein the fourth side portion is arranged in relation to the second side portion such that a pressure in the material is less in connection to the second side portion than in connection to the fourth side portion. One advantage is that the third and fourth side portions creates a wake effect and thus a local pressure decrease downstream the third and fourth side portions that further decreases the local pressure in the first and second side portions of the rotating die.

According to one example, the first channel section comprises leeward means in connection to the third and/or fourth side portions arranged to decrease the space of the first channel section in the height direction being perpendicular to the width direction.

According one example the first channel section comprises leeward means in connection to the third and/or fourth side portions arranged to decrease the space of the first channel section in the width direction. A combination of leeward means is also possible.

According to one example, the leeward means is an elevation facing into the through channel. The elevation can be arranged from top to bottom in the first channel section, or can be arranged as a part or several parts along the distance between the top to bottom of the first channel section. The leeward means are advantageously positioned in connection to the first and second side portions of the rotating die.

One advantage with the leeward means is that the third and fourth side portions further decreases the local pressure in connection to recesses and/or flange portions in the first and second side portions of the rotating die.

According to one example, the second channel section is arranged in relation to the first channel section with a predetermined second distance between the radially outermost portion of the circumferential surface of the rotating die and the counter-bearing in the channel portion being less than a predetermined first distance between the most far apart portions of the first channel section taken in a height direction coinciding with the radial direction, and/or wherein the second channel section is arranged in relation to the first channel section with a predetermined fourth distance between the innermost narrowest portions of the channel portion in the width direction being greater than a predetermined third distance between side walls in the first channel section taken in the width direction at the exit area from the first channel section.

One advantage is that the narrower first channel section creates a wake effect with decreased pressure downstream in the first channel section and in connection to the first and second side portions of the rotating die due to that the second channels section is broader.

According to one example, the channel portion comprises a third rotating die arranged at an angle to the first rotating die. This rotating die replaces the opposing first or second channel portion side wall entirely or partly. The third rotating die can be arranged together with only the first rotating die or together with both the first and second rotating dies.

According to one example, the channel portion comprises a fourth rotating die arranged opposite the third rotating die. The third rotating die can be arranged together with only the first rotating die or together with both the first and second rotating dies.

The third and/or the fourth rotating die(s) can be designed and configured in a similar way as the above described first rotating die to create equal or different patterns on or two sides of the electrode product.

According to one example, two or more rotating dies are synchronised. This has the advantage of feeding the material at the same speed. However, it could be possible to also use non-synchronous rotating dies in order to create friction and/or a special a pattern and/or to compensate for material differences, or to achieve curved profiles, that follows a radius instead of a straight line at an exit of the rotating die.

In a further preferred embodiment of the extrusion device of the invention, the device creates at least in sections an inert environment. Preferably, at least the rotating die or dies are exposed to the inert environment. Further preferred all sections, wherein the electrode substrate and/or electrode surface material are under the risk of oxidation, are exposed to the inert environment.

In a further preferred embodiment of the extrusion device of the invention, the device is configured to feed the electrode substrate material to the second channel section in an extrusion process or in a conveyor process.

In case of for example a substrate material in the form of a pre-manufactured foil, a conveyor process seems proper. To improve the conveyor process, the device may be equipped with respective guiding or conveying elements, such as rollers.

In a further preferred embodiment of the extrusion device of the invention, the device is configured to receive the electrode material in a form selectable from the following group or in any combination thereof: a metal, a material mixture, a powder, granules, a foil.

Generally, the material that is fed into the device to form the electrode product can be in the form of a homogenous material or a mixture of two or more materials that are blended and or layered. The materials can be blended in different ratios and may be blended into a homogeneous mix or a mix with gradients within the material. One material can be a solid and another material can be mouldable. The material can also be a layered material comprising two or more layers of same or different materials. The material may comprise one or more strings of solid material that follow through the entire extrusion or pultrusion process, e.g. a wire or another reinforcement material.

A second aspect of the invention refers to a method for producing an electrode product, wherein an inventive extrusion device according to the present disclosure is used. Therefore, all process related features disclosed with reference to the inventive device are likewise disclosed with reference to the inventive method and the other way around.

The method of the invention comprises the following steps:
Feeding an electrode substrate material to a first channel section of the device;
Feeding an electrode surface material to at least one additional inlet channel of the device;
Extruding said electrode surface material onto at least one surface of said electrode substrate material as or before the electrode material enters a second channel section of the device, which effects that inside the second channel section at least one surface of the electrode substrate material comprises the electrode surface material and is oriented towards a rotating die; and
Deform the electrode material into the electrode product.

According to one example, the electrode material or electrode product is stretched for achieving the same distance in the pattern along the production direction, i.e. to achieve equal distance between protrusions and/or indentations in the pattern along the production direction.

According to one example, the distance between indentations in the pattern on the rotating die is less than a distance between indentations in the corresponding pattern in the production direction on the electrode product, wherein a pulling and stretching device is configured to stretch the electrode material and/or the electrode product so that high precision in distance between features on them can be achieved by adjustment of the stretching.

Preferably, extrusion relates to a process wherein a material is fed by pressure into the first channel section to be formed in the first and second channel sections. preferably, pultrusion relates to a process wherein the material to be formed is fed to the device and drawn through the first and second channel sections. It should be noted that the device can be arranged purely for extrusion or purely for pultrusion or a combination of the two.

Furthermore, electrode product preferably refers to a product having a three dimensional form, i.e. a length, width and a height and functions as an electrode. The electrode product may have a cross-section taken in the width and height plane being similar all along the length or may be different dependent on position in length. The cross-section can have any suitable two dimensional shape, for example, round, oval, elliptical, i.e. two sides, undulating, three or more sides or a combination of the same.

One or more sides may be patterned, i.e. provided with structures, such a texture. The pattern is created by the rotating die. For example, the first channel section could be circumferentially delimited by static walls or could be arranged with one or more dynamic walls as long as the material can be extruded or pultruded with the device according to the invention. Static walls have the advantage of being cheap and robust.

According to one example, the first channel portions can be arranged centred with relation to the second channels. This has the advantage that the flow of material entering the second channel is evenly distributed. The first and second side portions can be arranged centred with respect to the first channel section with the advantage of having a evenly distributed decrease in pressure over the rotating die.

For example, the device could comprise several rotating devices arranged side by side, i.e. the rotating device could comprise two or more rotating devices having a common rotating axel. The different rotating devices could be arranged in separate second channels or could be arranged in a common separate channel. The different rotating devices could have the same or different texture to create same or different patterns on the electrode product. The electrode product could thus comprise one or more strands of internal profiles running along the production direction and being generated by the different rotating devices. The different strands could be separable into separate products at predetermined separation lines that could coincide with the separation of the different rotating devices. However, one separate rotating die could comprise a pattern/texture that separates similar or different patterns such that the electrode product comprises one or more strands of internal profiles running along the production direction. Also here, the strands could be separable in the electrode product.

According to one example, the rotating die and/or the counter-bearing comprises a cooling device that cools down the material when forming the electrode product. This has the advantage that a predetermined temperature of the material is achieved for optimum of material properties of the electrode product. The material temperature when extruding and/or pultruding can for certain materials be crucial for the quality of the electrode product. The temperature is also important due to frictional properties between the material and the rotating die and/or the counter-bearing. The cooling device can, for example, be arranged in the form of cooling circuits with gas or liquid fluid conductors arranged within the rotating die and/or the counter-bearing and/or external devices cooling down the rotating die and/or the counter-bearing and/or liquids or gaseous fluids added to the rotating die and/or the counter-bearing or a combination of such devices or any other suitable cooling devices.

According to one example, the rotating die is configured to be cooled on the surface so that the temperature of the rotating die surface is below a predetermined allowed temperature of the material.

According to one example, the rotating die is cooled on the surface so that the temperature of the rotating die surface is at least 10 degrees Celsius below a glass transition temperature or melting temperature of the material.

According to one example, the rotating die is cooled on the surface so that the temperature of the rotating die surface is at least 50 degrees Celsius below a glass transition temperature or melting temperature of the material, enabling higher speed of extruding.

The device can further be arranged for co-extrusion and/or on-extrusion with one or more inlet channels that connects to the first channel section. Hence, one or more materials could be fed to the first channel section via one channel, but two or more materials can be fed to the first channel section via one inlet channel or a multiple channel inlets. The multiple inlet channels can be the same in number as the number of materials or the multiple inlet channels can be less than the number of materials if two or more materials are fed via one inlet channel. Two or more materials can be fed to the first channel section and/or the second channel section via one inlet channel or multiple channel inlets. The multiple inlet channels can be the same or more in number as the number of materials or the multiple inlet channels can be less than the number of materials if two or more materials are fed via one inlet channel.

According to one example, the device according to any of the examples above comprises a pulling and stretching device arranged downstream the second channel section and configured to pull the material in the production direction when exiting the second channel section for transforming the final profile to the profile product.

According to one example, the distance between indentations in the pattern on the rotating die is less than a distance between elevations in the corresponding pattern in the production direction on the electrode product, wherein the pulling and stretching device is configured to stretch the electrode material and/or the electrode product so that high precision in distance between features on profile can be achieved by adjustment stretching. The distance between the indentations in the rotating die is taken in the rotation direction, i.e. along the circumferential surface in the rotation direction.

One advantage is that the pulling and stretching device dynamically can stretch the material in the electrode material during its transition to the electrode product, e.g. in order to obtain an equidistant pattern in the production direction of the electrode product.

The pulling and stretching device can further be used to guide the electrode product in the width and/or height direction during its transition from the electrode material to the electrode product in order to control bending.

The pulling and stretching device can be any type of device that comprises means for gripping the material and means for pulling. According to one example, the pulling and stretching device comprises controlling means for controlling the pulling force applied to the material. The controlling means may comprise sensor(s) and/or may be connected to sensor(s) that supervise the state of the electrode material and/or product during its production progress. The sensor(s) comprise means for sending analogue and/or digital information to the controlling means. The information relates to the state of the material and the controlling means is configured to process the information for controlling the pulling and stretching device.

This enables good precision in distance between three dimensional-longitudinal features of profile, e.g. teeth in a pinion rack, making it possible to stretch profile so that high equidistant precision between teethes in a pinion rack or teethed belt becomes possible.

This also enables a possibility to design the rotating die so it results in an electrode product that deliberately has a slightly shorter distance between three dimensional features, before stretching and gives room for stretching/pulling.

A third aspect of the invention refers to an electrode product, manufactured by an inventive extrusion device according to the present disclosure and/or manufactured in an inventive method according to the present disclosure.

A fourth aspect of the invention refers to an energy storage device, comprising an inventive electrode product according to the present disclosure.

Said energy storage device may for example comprise a battery, a capacitor, fuel cell or any combination thereof.

According to a preferred embodiment of the energy storage device of the invention, the energy storage device is a secondary battery.

This preferably refers to a rechargeable battery.

A fifth aspect of the invention refers to a vehicle, comprising an inventive electrode product according to the present disclosure and/or an inventive energy storage device according to the present disclosure.

Preferably, said vehicle is an at least partially electrically driven vehicle. Further preferred, it is a vehicle that is fully electrically driven.

Summarized again in other words, the disclosed invention refers to a device and a method for 3D-extruding electrodes that are useful for electrochemical reactions or energy storage in batteries, secondary batteries, capacitors or fuel cells. The described method solves problems of time and cost-consuming steps, by integrating many steps into one step, by co-extruding with rotating dies onto a base profile, enabling elimination of at least one production step at the same time as it enables extrusion of electrodes with macro-, micro-, and/or nano-patterns, thus enabling bigger electrochemical reaction surfaces and cross-channels that speed-up filling of electrolyte.

Unless indicated otherwise, all embodiments described herein are compatible with each other and the beneficial technical effects apply respectively.

BRIEF DESCRIPTION OF THE DRAWINGS

The invention will be described in further detail below with reference to the accompanying drawings, in which.

DETAILED DESCRIPTION

Figure 1:
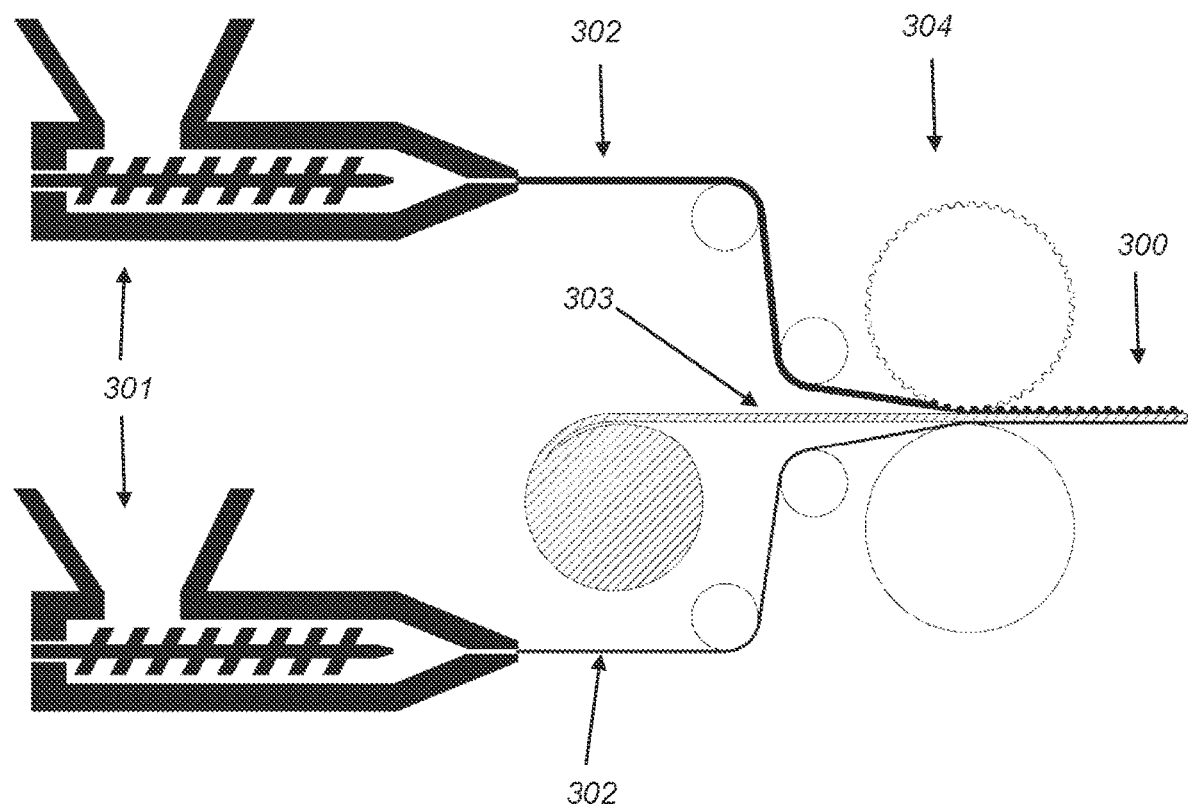
FIG. 1 is a schematic illustration of a method of manufacturing an electrode product known from the state of the art.

Starting with FIG. 1, a known method of manufacturing an electrode product 300 is shown. In the known method, conventional extrusion devices 301 used to pre-manufacture electrode surface parts 302. Further, a pre-manufactured electrode substrate part 303 is provided, for example from a roller storage. Said electrode surface parts 302 and said electrode substrate part 303 are fed onto lamination and forming unit 304, wherein said electrode surface parts 302 are laminated on both sides of said electrode substrate part 303 and may be provided with a surface structure.

In the known process, a variety of different processes are carried out separately, such as extrusion, storing, conveying, laminating and forming. Based on this, the pre-known process is adding high costs to the manufactured electrode product 300, for example based on the required space and equipment.

Figure 2:
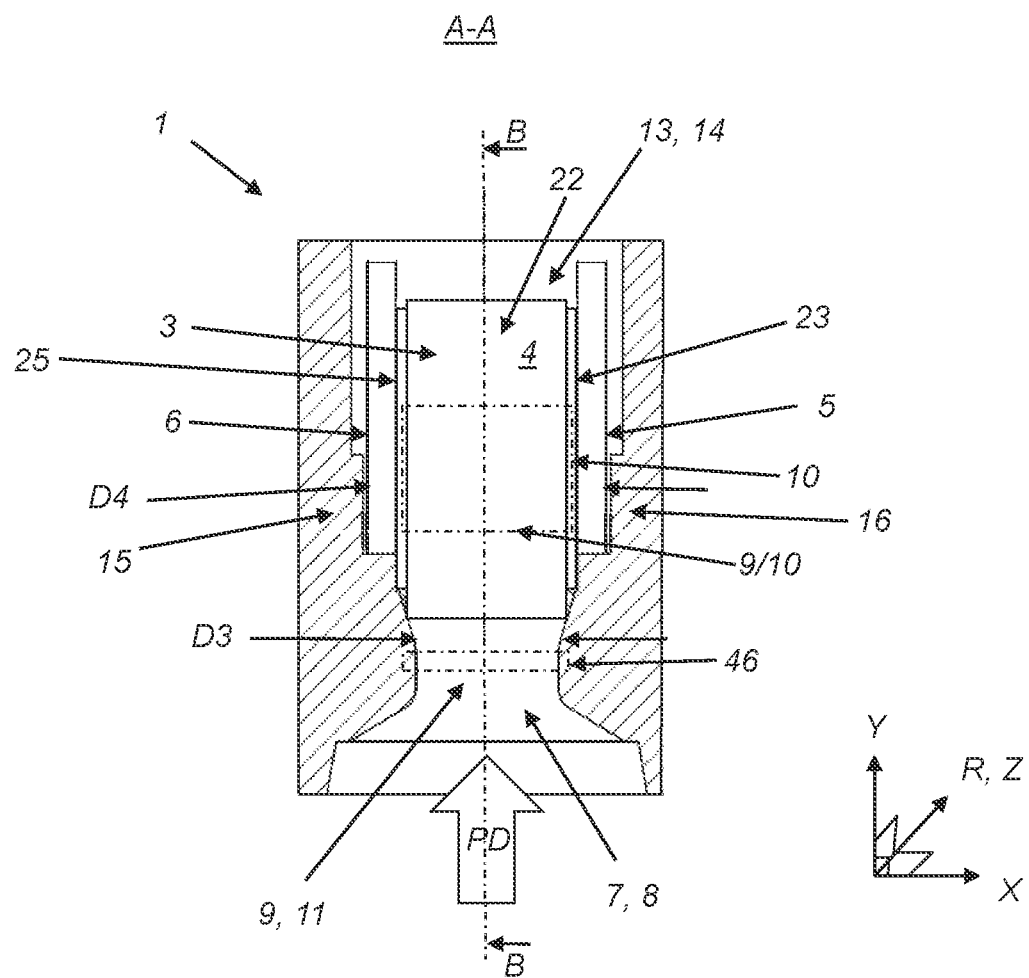
FIG. 2 schematically shows a cross-sectional view of an embodiment of a device according to the invention with respect to cutting line A-A in FIG. 3.

FIG. 2 schematically shows a cross-sectional view of an embodiment of an extrusion device 1 for forming an electrode product 2 according to the invention, wherein all required process steps can be carried out in an integral manner. The electrode product 2 is not shown in FIG. 2 but can be seen in FIGS. 3-7. The embodiment shown in FIG. 2 is corresponding to the embodiment shown in FIG. 3 and with respect to cutting line A-A shown in FIG. 3. An electrode material 200, which can be processed by the inventive device 1 to be turned into the electrode product 2, is not shown in FIG. 2, either, but can be seen in FIGS. 3-8.

Figure 3:
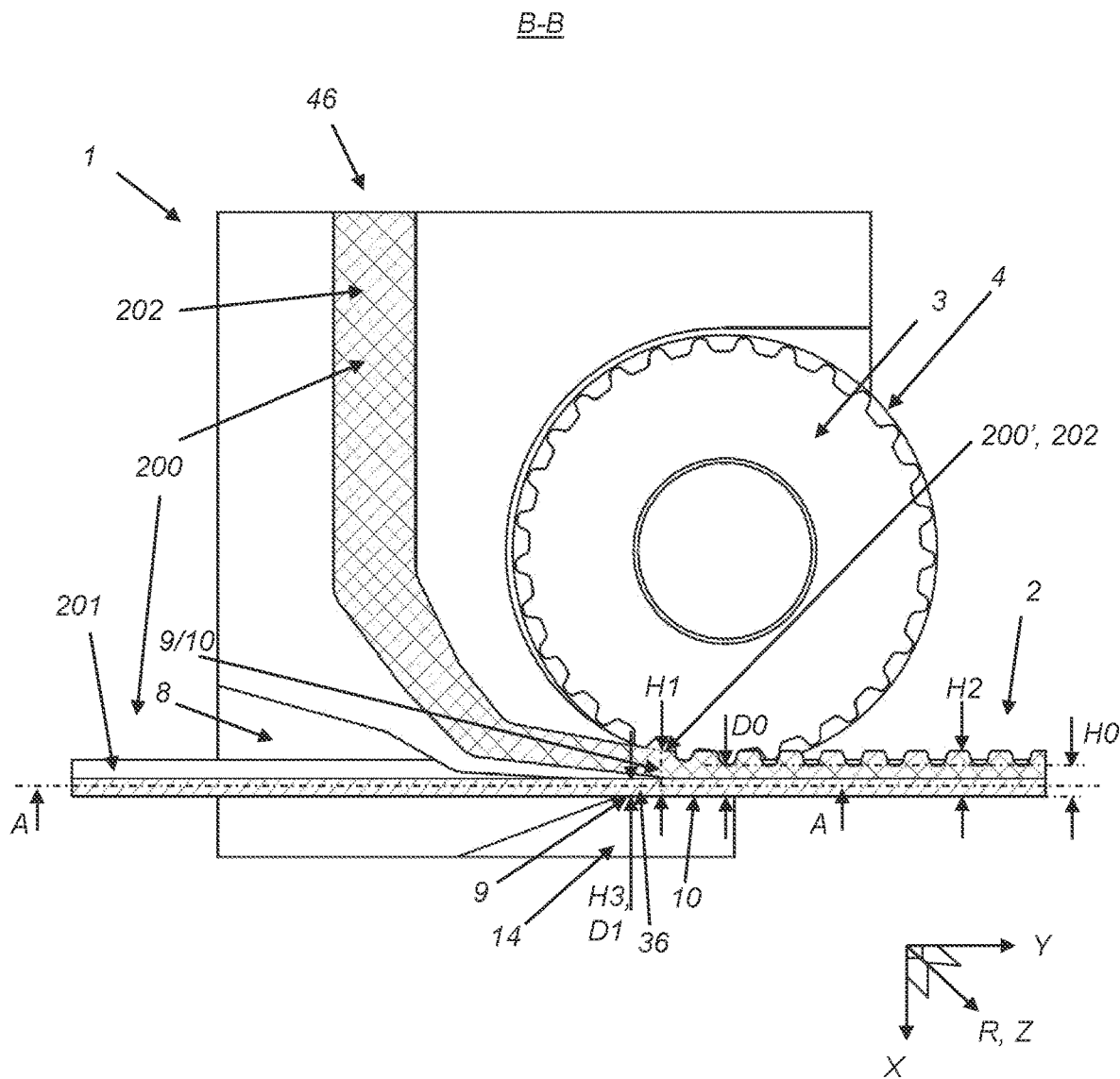
FIG. 3 schematically shows an embodiment of a device according to the invention with respect to cutting line B-B in FIG. 2.

The extrusion device 1 of the invention shown in FIG. 2 is designed for forming the electrode product 2 made from then electrode material 200 in a production direction PD, said device essentially comprises the following features:

A first rotating die 3, extending in a radial direction R and a width direction X, having two opposite first and second side walls 5, 6 and an outer circumferential surface 4 extending in the width direction X there between, wherein the first rotating die 3 comprises a first side portion 23 in connection to the first side wall 5 and a second side portion 25 in connection to the second side wall 6 and a mid-portion 22 extending between the first and second side portions 23, 25. Generally, the circumferential surface 4 may be unstructured, as shown in FIG. 2 or structures, as shown in FIG. 3.

An electrode profile definition zone 7 having a longitudinal direction Y coinciding with the production direction PD, a height direction Z and a width direction X being perpendicular to the height direction Z, comprising a through channel 8 comprising a first channel section 9 followed by a second channel section 10 downstream the first channel section 9 with reference to the production direction PD.

The first rotating die 3 is rotatable about an axis extending across the production direction Y and arranged to allow the outer circumferential surface 4 to, while the first rotating die 3 rotates, exert a pressure onto a surface of the electrode material 200 when fed through the profile definition zone 7.

The first channel section 9 is circumferentially delimited by one or more walls 11, and the second channel section 10 is circumferentially delimited by the circumferential surface 4 of the first rotating die 3 and a channel portion 13, that comprises a counter-bearing 14 (compare also FIGS. 3-7) opposite the first rotating die 3 and opposing first and second channel portion side walls 15, 16 between the first rotating die 3 and the counter-bearing 14. Optionally, the channel portion 13 comprises the counter-bearing 14 arranged opposite the first rotating die 3. In this embodiment the first and second side portions of the rotating die comprises first and second flange portions extending in a radial direction with an extension exceeding the radial extension of at least a part of the mid-portion of the rotating die, wherein the first and second flange portions are arranged to prevent movement of the material outside the rotating die.

According to the invention, the through channel 8 is configured to receive an electrode substrate material 201 (see FIGS. 3-7) to be fed downstream and the device 1 further comprises at least one additional inlet channel 46 (compare FIGS. 3-7), which is configured to receive an electrode surface material 202 (see FIGS. 3-8) and to feed it to the through channel 8, wherein said at least one additional inlet channel 46 and the first channel section 9 of said through channel 8 are combined in a marriage section 9/10 in a manner that said electrode surface material 202 is extruded onto said electrode substrate material 201, which effects that inside the second channel section 10 at least a first surface 200' (see FIGS. 3-8) of said electrode material 200, that is oriented towards the first rotating die 3, comprises said electrode surface material 202, wherein said marriage section 9/10 is either located upstream of where the first channel section 9 transitions into the second channel section 10 or at this location, the latter being exemplarily shown in FIG. 3, and wherein further the second channel section 10 is configured to deform the electrode material 200 into the electrode product 2 having a minimum height H0, as exemplarily shown in FIG. 3, by the first rotating die 3 being configured to apply increasing pressure on the electrode material 200 against the counter-bearing 14 when the electrode material 200 exits the first channel section 9, and wherein the first rotating die 3 is configured at a minimum distance D0 between the first rotating die 3 and the counter-bearing 14 dependent on a maximum allowable pressure applied by the first rotating die 3 at the position of that minimum distance D0, wherein the maximum allowable pressure corresponds at least to the maximum difference in height H1 of the electrode material 200 exiting the first channel section 9 and the height H2 of the electrode product 2.

All features not further commented on in the following are identic with those described with reference to FIG. 2.

Now turning to FIG. 3, the same embodiment of the device 1 is schematically shown, with respect to cutting line B-B shown in FIG. 2. In FIG. 3, the electrode product 2 is illustrated as it exits the device 1. FIG. 3 also shows the electrode material 200 input to the device 1.

In FIG. 3, the marriage section 9/10, wherein the first channel section 9 transitions into the second channel section 10, and the counter-bearing 14 are illustrated.

It can be seen, how the electrode substrate material 201 enters the through channel 8 and is fed downstream towards the marriage section 9/10.

Further, the additional inlet channel 46 is illustrated and how the electrode surface material 202 is fed via said additional inlet channel 46 to the through channel 8.

The electrode surface material 202 enters the through channel 8 at the marriage section 9/10, where the additional inlet channel 46 and the first channel section 9 are combined.

Thus, said electrode surface material 202 is extruded onto said electrode substrate material 201 in the marriage section 9/10, which effects that inside the second channel section 10, that directly follows the marriage section 9/10 in this example, the first surface 200' of the electrode material 200, that is oriented towards the first rotating die 3, comprises said electrode surface material 202.

In other examples, the marriage section 9/10 could also be located further upstream of where the first channel section 9 transitions into the second channel section 10.

In the second channel section 10, the electrode material 200 is deformed into the electrode product 2. Said electrode product 2 therefrom has a minimum height H0 by the first rotating die 3 being configured to apply increasing pressure on the electrode material 200 against the counter-bearing 14, when the electrode material 200 exits the first channel section 9. The first rotating die 3 is further configured at a minimum distance D0 between the first rotating die 3 and the counter-bearing 14 dependent on a maximum allowable pressure applied by the first rotating die 3 at the position of that minimum distance D0, wherein the maximum allowable pressure corresponds at least to the maximum difference in height H1 of the electrode material 200 exiting the first channel section 9 and the height H2 of the electrode product 2.

Preferably but optionally, the first channel section 9 may be configured to deform the electrode material 200 into a master profile 36 having a maximum height H3 at a predetermined feeding rate dependent on the electrode material 200 and a minimum cross-sectional area with a first maximum height D1 in the first channel section 9, and wherein the second channel section 10 is configured to further deform the master profile 36 into the electrode product 2 having the minimum height H0 by the first rotating die 3 being configured to apply the increasing pressure on the master profile 36 against the counter-bearing 14 when the master profile 36 exits the first channel section 9, and wherein the first rotating die 3 is configured at the minimum distance D0 between the first rotating die 3 and the counter-bearing 14 dependent on the maximum allowable pressure applied by the first rotating die 3 at the position of that minimum distance D0, wherein the maximum allowable pressure corresponds at least to the maximum difference in height H3 of the master profile 36 and the electrode product 2.

Now, reference will be made to the other Figures in more detail. Based on the common essential and optional features described above, only the differences of the following further developed embodiments will be described. Same reference signs and illustrations are referring to the same features as described above.

Figure 4:
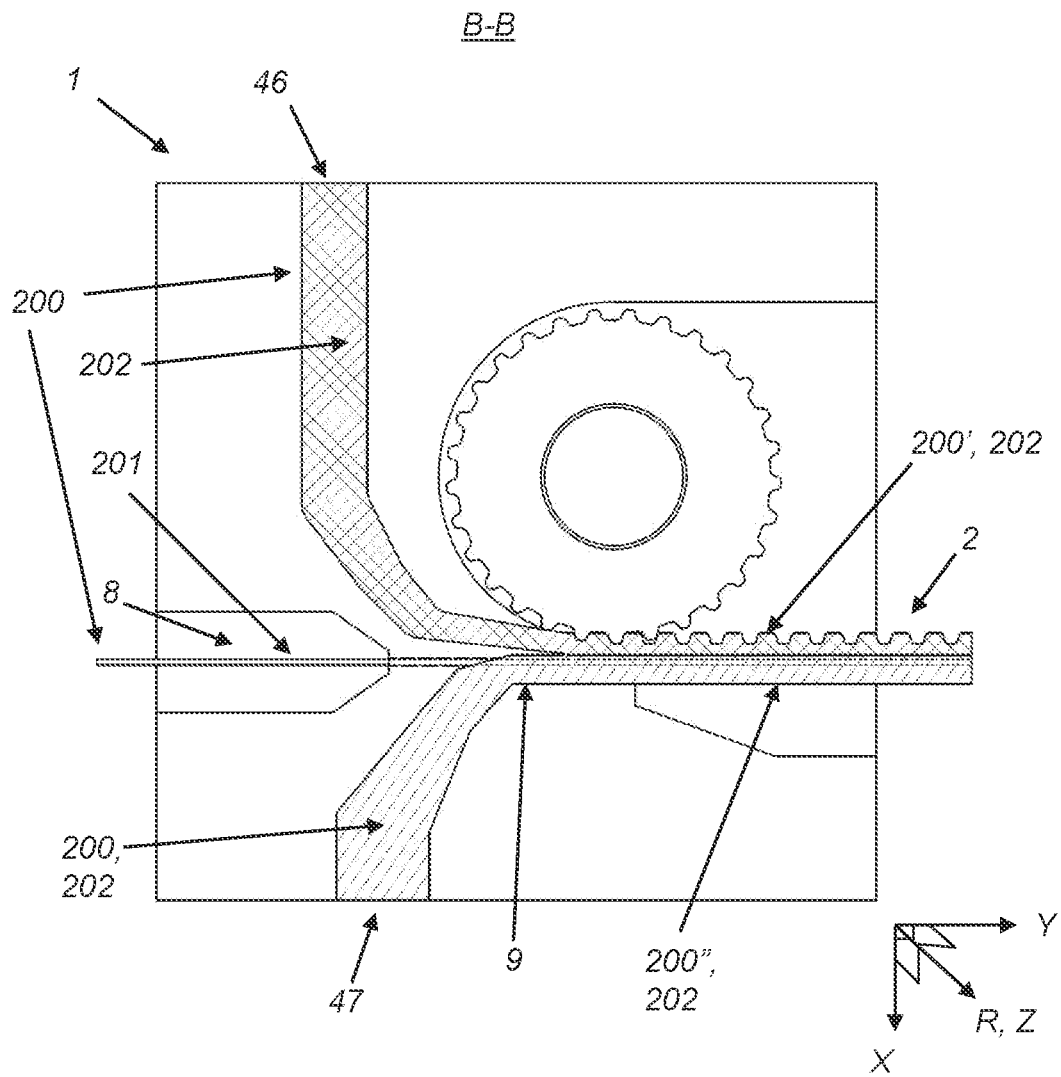
FIG. 4 schematically shows another embodiment of a device according to the invention with respect to cutting line B-B in FIG. 2.

FIG. 4 shows and embodiment of the device 1 that comprises a third inlet channel 47 that is connected to the first channel section 9 and configured to feed an electrode surface material 202 in the same manner as the other additional inlet channel 46, with said electrode surface material 202 from the third inlet channel 47 being extruded onto the electrode substrate material 201 also on a second surface 200" of the electrode material 200 that comprises said electrode surface material 202.

Optionally, the electrode surface material 202 from the third inlet channel 47 may be extruded onto the electrode substrate material 201 in a way that the electrode substrate material 201 is embedded in the electrode surface material 202, as exemplarily shown in FIG. 4.

The electrode surface material 202 from the third inlet channel 47 and from the other additional inlet channel 46 may be the same materials or different materials.

Figure 5:
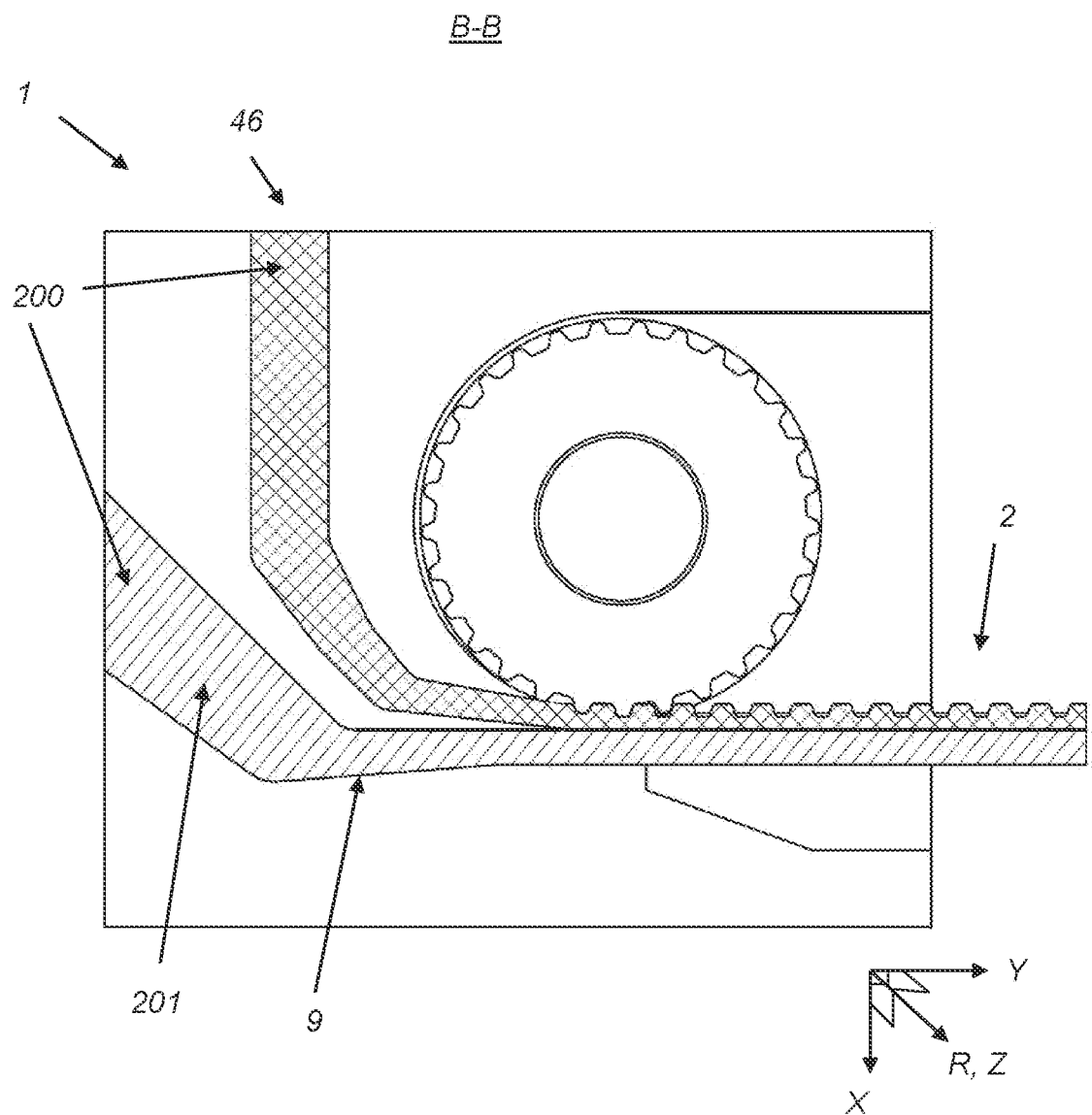
FIG. 5 schematically shows another embodiment of a device according to the invention with respect to cutting line B-B in FIG. 2.

In another example shown in FIG. 5, it can be seen how the electrode substrate material 201 is additionally deformed in the first channel section 9.

Figure 6:
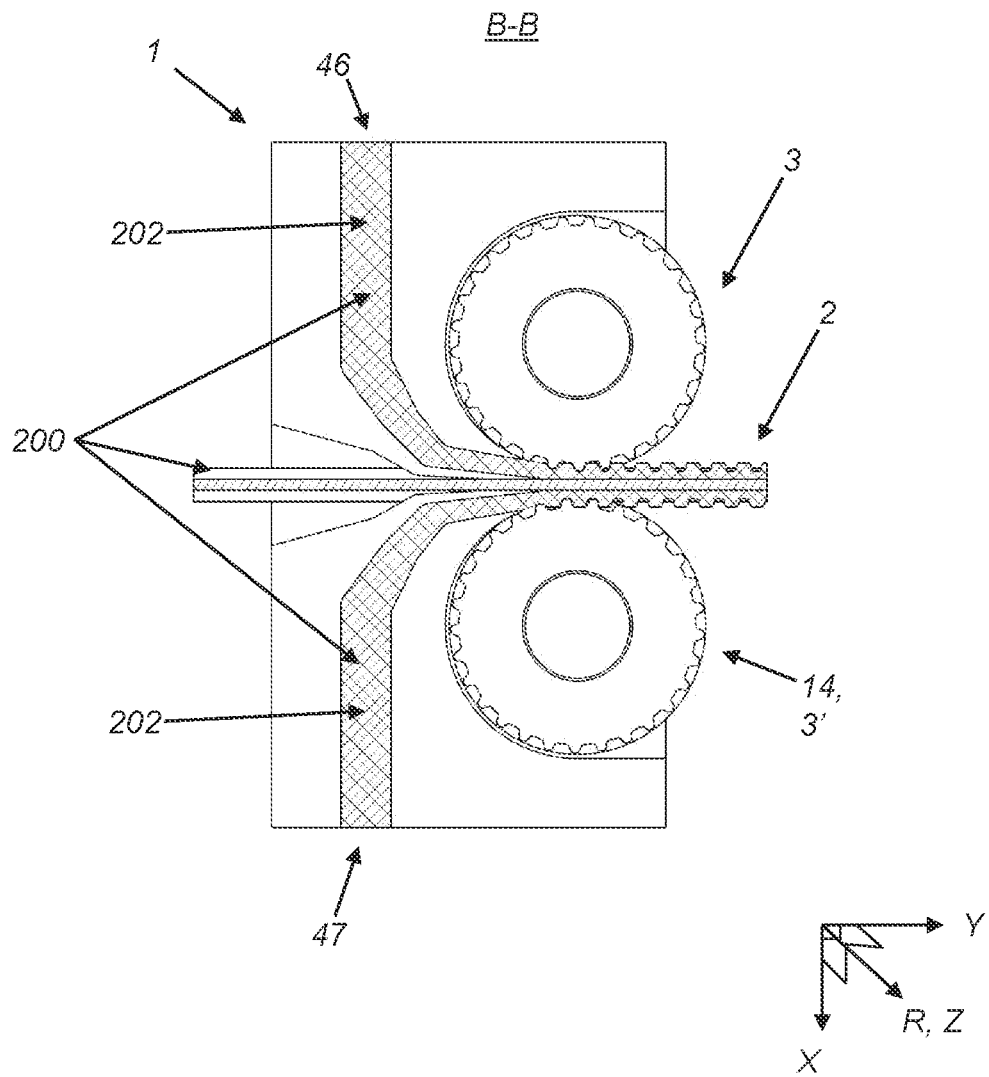
FIG. 6 schematically shows another embodiment of a device according to the invention with respect to cutting line B-B in FIG. 2.

In yet another embodiment shown in FIG. 6, the counter-bearing 14 of the device 1 comprises a second rotating die 3'. Said second rotating die 3' may be designed and configured an analogous manner as the first rotating die 3 or in a different manner.

Optionally, the counter-bearing 14 may consist of that second rotating die 3'.

The electrode surface material 202 delivered by the additional inlet channel 46 and the third inlet channel 47 are both exposed to the respective first 3 and second rotating die 3' in this embodiment.

Figure 7:
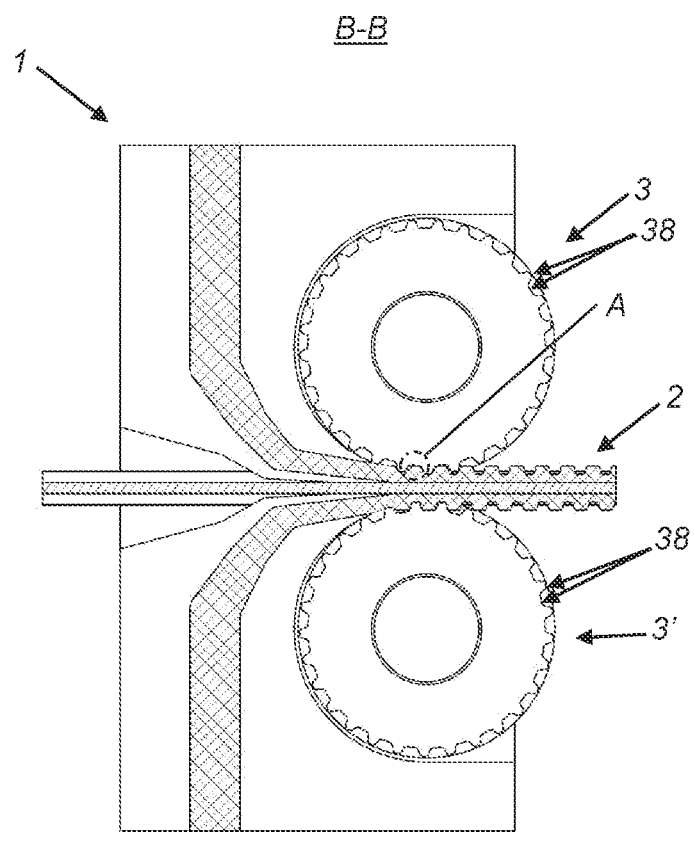
FIG. 7 schematically shows another embodiment of a device according to the invention with respect to cutting line B-B in FIG. 2.

In a preferred embodiment as shown in FIG. 7, a pattern 38 is provided on the circumferential surface 4 of at least one rotating die 3, 3' and further the maximum allowable pressure corresponds to the maximum difference in height of the electrode material 200 exiting the first channel section 9 or the maximum difference in height of the master profile 36, respectively, and to the electrode product 2 and said pattern 38. Preferably and exemplarily shown in FIG. 7, said pattern 38 is provided on both the rotating dies 3, 3'. The pattern 38 may be the same or different on each die 3, 3'.

Figure 8:
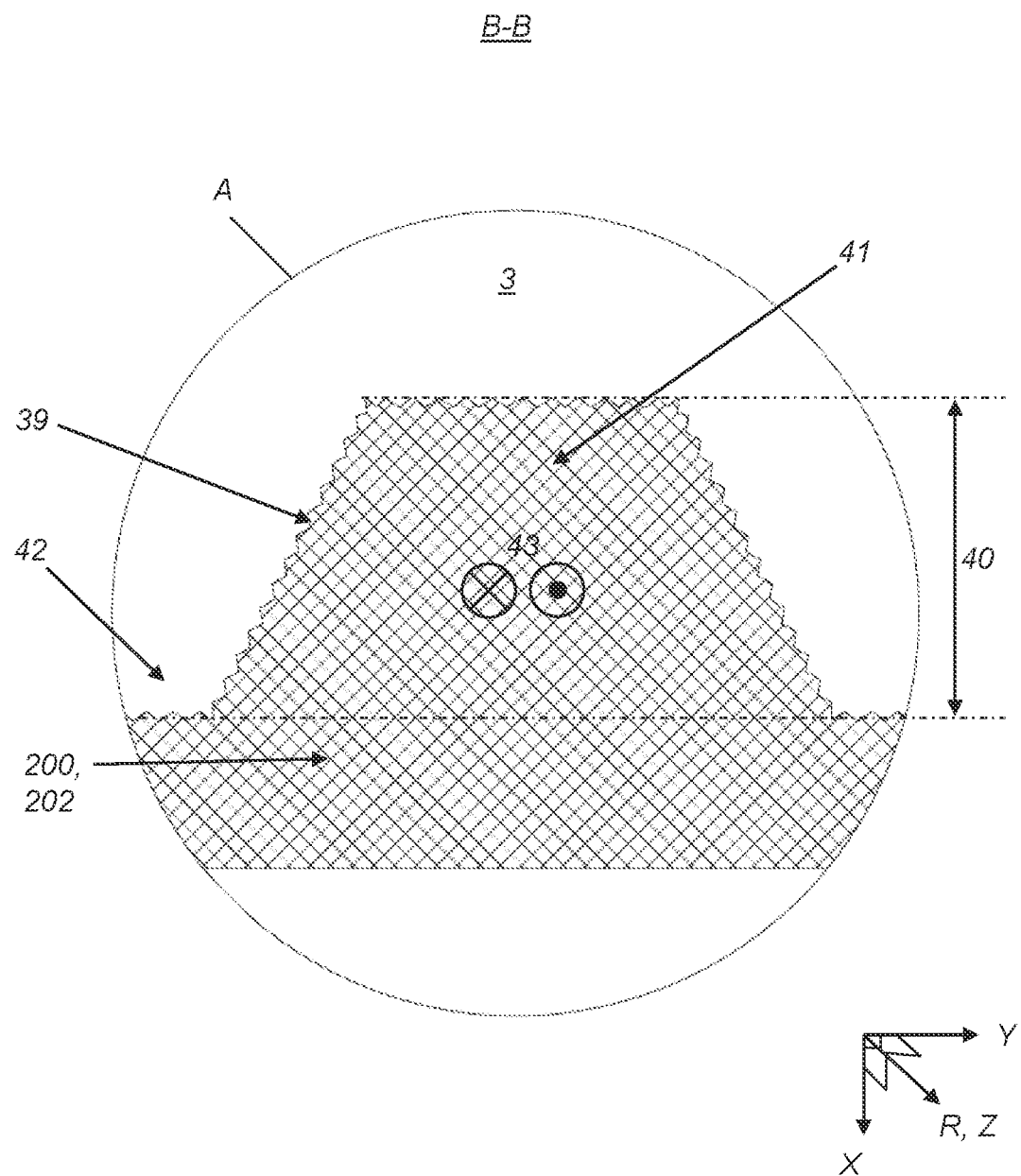
FIG. 8 shows a detail A as indicated in FIG. 7.

The pattern 38 is shown in more detail in FIG. 8, according to detail A indicated in FIG. 7.

As can be seen in FIG. 8 merely as an example, the pattern 38 may preferably comprise a microstructure 39 to enhance the surface area of the electrode product 2. Further, the pattern 38 may preferably comprise a macrostructure 40. The macrostructure 40 may for example comprise indentations 41 and protrusions 42.

As the pattern 38 is applied to the electrode surface material 202, a respective negative of said pattern 38 is imprinted on the electrode surface material 202. This is one preferred example, how a 3D-electrode with an increased surface area can be made.

Preferably, said pattern 38 comprises protrusions 42 forming at least one channel 43 in at least one surface of the electrode product 2. Preferably, said one or more channels 43 extend across the surface of the electrode product 2, preferably the entire surface.

Generally, which means in all embodiments, it is preferred that the device 1 creates at least in sections an inert environment in order to protect the electrode material 200. Further generally preferred, the device 1 is configured to feed the electrode substrate material 201 to the second channel section 10 in an extrusion process or in a conveyor process. Generally, the electrode material 200 may be received by the device 1 in a form selectable from the following group or in any combination thereof: a metal, a material mixture, a powder, granules, a foil.

Figure 9:
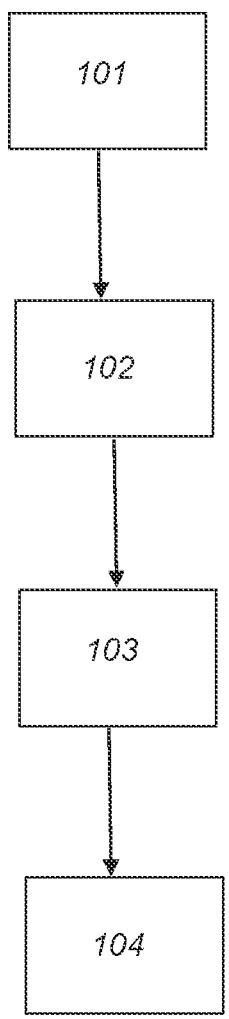
FIG. 9 shows a block diagram of a method according to the invention.

Finally turning to FIG. 9, an inventive method for producing an electrode product 2 is described, wherein an extrusion device 1 according to any one of the above embodiments is used and. Accordingly, reference can be made to any of those embodiments. The method comprises the following steps:

In a first step 101, the electrode substrate material 201 is fed to the first channel section 9 of the device 1.

In a second step 102, an electrode surface material 202 is fed to at least one additional inlet channel 46, 47 of the device 1.

In a third step 103, said electrode surface material 202 is extruded onto at least one surface 200' of said electrode substrate material 201 as or before the electrode material 200 enters a second channel section 10 of the device 1, which effects that inside the second channel section 10 at least one surface of the electrode substrate material 201 comprises the electrode surface material 202 and is oriented towards a rotating die 3, 3'.

In a fourth step 104, the electrode material 200 is formed into the electrode product 2.

Figure 10:
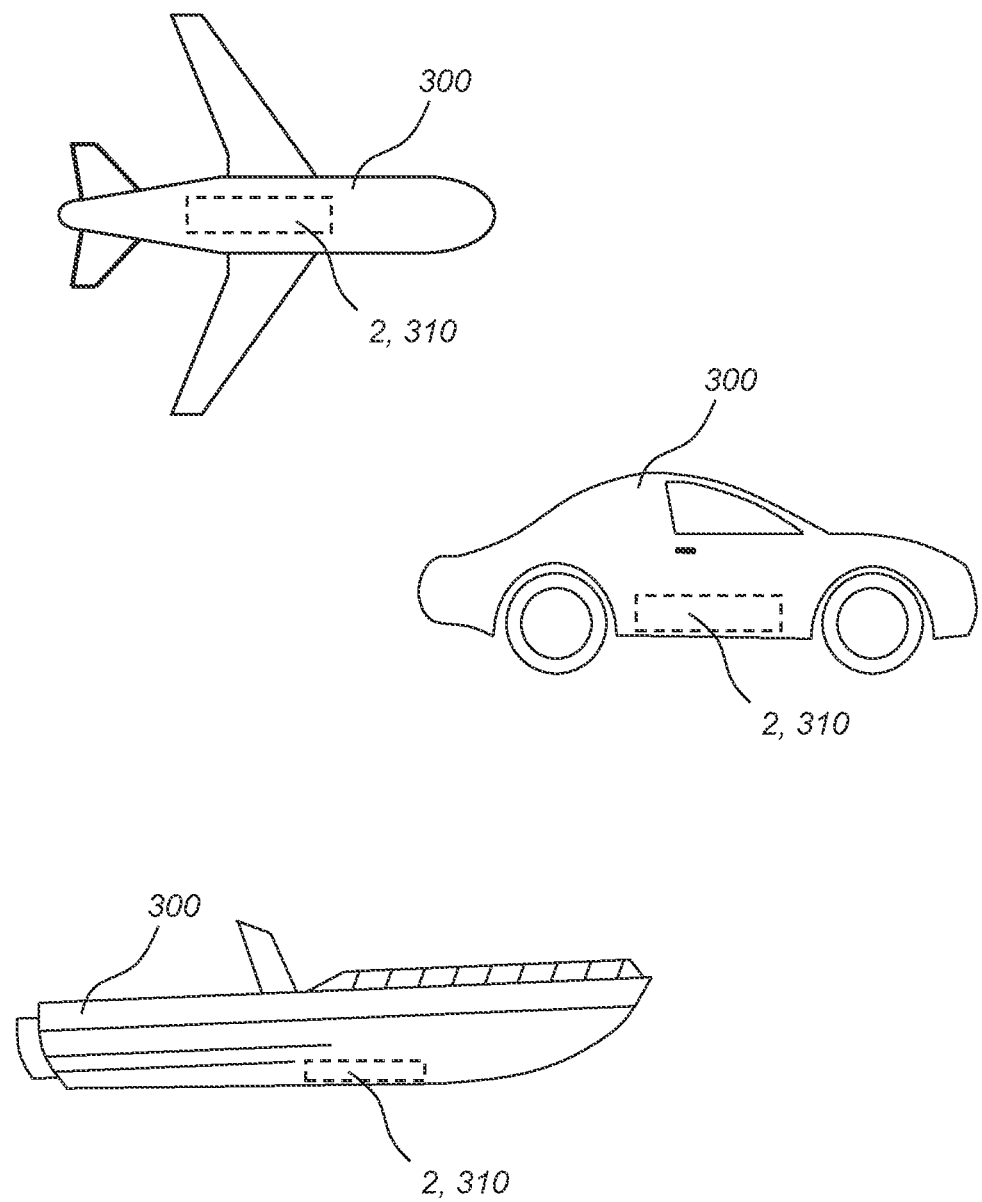
FIG. 10 shows vehicles according to different embodiments.

In FIG. 10 a number of different vehicles 300 are shown. Each vehicle, may it be a plane, a train, a boat, a ship, or a wheeled vehicle such as a car or a truck, comprises an electrode product 2 and/or an energy storage device 310 which in turn comprises an electrode product 2.

The invention claimed is:

1. An extrusion device for forming an electrode product made from an electrode material in a production direction along which the electrode product travels, said device comprising:
    a first rotating die, extending in a radial direction and a width direction, having two opposite first and second side walls and an outer circumferential surface extending in the width direction therebetween, wherein the first rotating die comprises a first side portion in connection inward to the first side wall, a second side portion in connection inward to the second side wall, and a mid-portion defining the circumferential surface extending between the first and second side portions, and
    an electrode profile definition zone having a longitudinal direction coinciding with the production direction, a height direction, and a width direction being perpendicular to the height direction, and comprising a through channel comprising a first channel section followed by a second channel section downstream the first channel section with reference to the production direction,
    wherein the first rotating die is rotatable about an axis extending across the production direction and arranged to cause the outer circumferential surface to, while the first rotating die rotates, exert a pressure onto a surface of the electrode material when fed through the profile definition zone,
    wherein the first channel section is circumferentially delimited by one or more walls,
    wherein the second channel section is circumferentially delimited by:
        the circumferential surface of the first rotating die, and
        a channel portion comprising a counter-bearing opposite the first rotating die, and
        wherein the through channel is configured to receive and deform an electrode substrate material to be fed downstream of the through channel and the device further comprises at least one additional, inlet channel which is configured to receive an electrode surface material and to feed the electrode surface material to the through channel, wherein said at least one additional, inlet channel and the first channel section of said through channel are combined in a marriage section of the extrusion device in a manner that said electrode surface material is extruded onto said electrode substrate material thereby forming the electrode material such that inside the second channel section at least a first surface of said electrode material oriented towards the first rotating die comprises said electrode surface material, wherein said marriage section is either located upstream of, or where the first channel section transitions into the second channel section, wherein the second channel section is configured to further deform the electrode material into the electrode product continuing in the production direction downstream of the second channel section and having a minimum height by the first rotating die being configured to apply increasing pressure on the electrode material against the counter-bearing when the electrode material exits the first channel section, wherein the first rotating die is configured at a minimum distance between the first rotating die and the counter-bearing dependent on a maximum allowable pressure applied by the first rotating die at the position of that minimum distance, and wherein the maximum allowable pressure corresponds at least to the maximum difference in height of the electrode material exiting the first channel section and the height of the electrode product.

2. A device according to claim 1, wherein the channel portion further comprises opposing first and second side walls of the channel portion extending between the first rotating die and the counter-bearing, or the first and second side portions of the first rotating die comprises respective first and second flange portions extending in a radial direction with an extension exceeding the radial extension of at least a part of the mid-portion of the first rotating die, with the first and second flange portions arranged to prevent movement of the electrode material outside the first rotating die.

3. A device according to claim 1, wherein the first channel section is configured to deform the electrode material into a master profile having a maximum height at a predetermined feeding rate dependent on the electrode material and a minimum cross-sectional area with a first maximum height of the first channel section, wherein the second channel section is configured to further deform the master profile into the electrode product having the minimum height by the first rotating die being configured to apply the increasing pressure on the master profile against the counter-bearing when the master profile exits the first channel section, and wherein the first rotating die is configured at the minimum distance between the first rotating die and the counter-bearing dependent on the maximum allowable pressure applied by the first rotating die at the position of that minimum distance, and wherein the maximum allowable pressure corresponds at least to the maximum difference in height of the master profile and the electrode product.

4. A device according to claim 3, wherein a pattern is provided on the circumferential surface of the first rotating die and wherein further the maximum allowable pressure corresponds to the maximum difference in height between the electrode product and either the electrode material exiting the first channel section or the master profile, and said pattern.

5. A device according to claim 4, wherein said pattern comprises a microstructure to enhance the surface area of the electrode product, thus forming a 3D-electrode.

6. A device according to claim 4, wherein said pattern comprises protrusions forming at least one channel in at least one surface of the electrode product.

7. A device according to claim 1, wherein the counter-bearing comprises a second rotating die.

8. A device according to claim 7, wherein the at least one additional inlet channel comprises a second inlet channel configured to feed said electrode surface material to the through channel and a third inlet channel configured to feed additional electrode surface material to the through channel, with said additional electrode surface material from the third inlet channel being extruded onto the electrode substrate material on a second surface of the electrode substrate material with respect to said electrode surface material from the second inlet channel, and with said additional electrode surface material being exposed to the second rotating die.

9. A device according to claim 4, wherein a pattern is provided on the circumferential surface of the first and second rotating dies.

10. A device according claim 1, wherein the device creates at least in sections thereof an inert environment.

11. A device according to claim 1, wherein the device is configured to feed the electrode substrate material to the second channel section in an extrusion process or in a conveyor process.

12. A device according to claim 1, wherein the device is configured to receive the electrode material in a form selected from a metal, a material mixture, a powder, granules, a foil, and combinations thereof.

13. A device according to claim 1, wherein the electrode product is an electrode product for an energy storage device.

14. A device according to claim 13, wherein the energy storage device is a secondary battery.

15. A device according to claim 13, wherein the energy storage device is an energy storage device for a vehicle.

16. A device according to claim 1, wherein the electrode product is an electrode product for a vehicle.

17. A method for producing an electrode product by an extrusion device according to claim 1, wherein the method comprises:
    feeding an electrode substrate material to the first channel section of the device;
    feeding an electrode surface material to the at least one additional, inlet channel of the device;
    extruding said electrode surface material onto at least one surface of said electrode substrate material at the marriage section; and
    deforming the electrode material into the electrode product.

18. A method according to claim 17, wherein the electrode product is an electrode product for an energy storage device.

19. A method according to claim 18, wherein the energy storage device is a secondary battery.

20. A method according to claim 17, wherein the electrode product is an electrode product for a vehicle.

* * * * *